United States Patent [19]

Carson

[11] Patent Number: 4,648,285

[45] Date of Patent: * Mar. 10, 1987

[54] APPARATUS FOR CONVERTING ROTATIONAL MOTION TO LINEAR MOTION

[75] Inventor: William W. Carson, Mendon, Mass.

[73] Assignee: Millipore Corporation, Bedford, Mass.

[*] Notice: The portion of the term of this patent subsequent to Jul. 2, 2002 has been disclaimed.

[21] Appl. No.: 734,810

[22] Filed: May 16, 1985

Related U.S. Application Data

[62] Division of Ser. No. 466,283, Feb. 14, 1983, abandoned.

[51] Int. Cl.[4] ............... F16H 25/22; F16H 25/24
[52] U.S. Cl. ................. 74/424.8 C; 74/458; 74/459
[58] Field of Search ............ 74/424.8 C, 424.6, 458, 74/457, 459, 424.8 R

[56] References Cited

U.S. PATENT DOCUMENTS

| | | | |
|---|---|---|---|
| 1,384,543 | 7/1921 | Scmick | 74/458 |
| 2,831,363 | 4/1958 | Lohr | 74/424.8 C |
| 3,028,635 | 10/1962 | Herubel | 74/458 |
| 3,173,304 | 3/1965 | Strandgren | 74/424.8 C |
| 3,406,584 | 10/1968 | Roantree | 74/458 |
| 3,595,094 | 7/1971 | Lemor | 74/424.8 C |
| 3,884,090 | 5/1975 | Dock | 74/424.8 C |
| 4,375,770 | 3/1983 | Druet | 74/424.8 C |
| 4,478,103 | 10/1984 | Benjamin | 74/424.8 R |
| 4,526,053 | 7/1985 | Carson | 74/424.8 C |

FOREIGN PATENT DOCUMENTS

| | | | |
|---|---|---|---|
| 1002930 | 1/1977 | Canada | 74/424.8 C |
| 1450848 | 4/1969 | Fed. Rep. of Germany | 74/424.8 C |
| 2807952 | 8/1978 | Fed. Rep. of Germany | 74/424.8 C |
| 290685 | 5/1953 | Switzerland | 74/424.8 C |
| 484345 | 1/1976 | U.S.S.R. | 74/424.8 C |
| 737687 | 6/1980 | U.S.S.R. | 74/424.8 C |
| 832,178 | 5/1981 | U.S.S.R. | 74/424.8 C |

*Primary Examiner*—Allan D. Herrmann
*Attorney, Agent, or Firm*—Andrew T. Karnakis; Paul J. Cook

[57] ABSTRACT

Apparatus is provided for converting rotational motion to linear motion which includes a screw shaft and nut surrounding the screw shaft, each having a helical thread. A plurality of threaded planetary rollers is interposed between and in contact with the threads of the screw shaft and nut. The screw shaft has a different number of starts than the number of starts on the nut.

5 Claims, 7 Drawing Figures

APPARATUS FOR CONVERTING ROTATIONAL MOTION TO LINEAR MOTION

This is a divisional of co-pending application Ser. No. 466,283 filed on Feb. 14, 1983 now abandoned.

BACKGROUND OF THE INVENTION

This invention relates to an apparatus for converting rotational motion to linear motion. More particularly, this invention relates to an apparatus for converting rotational motion to linear motion which utilizes a screw shaft and a nut, both having helical threads and between which are interposed threaded planetary rollers.

Prior to the present invention, roller screw drives have been available which comprise a screw shaft axially positioned within a nut and wherein a plurality of planetary rollers are positioned between the screw shaft and the nut. The rollers mesh with a helical thread on the nut and a helical thread on the screw shaft. The helix on the nut and the screw shaft extend in the same helix direction. In addition, the shaft and the nut have the same lead (distance advanced per revolution) and the same number of starts (beginning of a helical thread). When the nut is rotated, the shaft is caused to move axially with respect to the nut and the rollers. The rollers may or may not move axially with respect to the nut. As used herein, the term "start" is defined as the beginning of a helical thread in the right-hand screw thread direction or clockwise moving away from the observer. The term "negative start" is defined herein as the beginning a helical thread in the lefthand screw thread direction or counterclockwise moving away from the observer. Thus, as used herein, a nut and screw will have equal starts when each has the same number of starts and the starts extend in the same direction.

Presently available roller screw drives utilize a nut and a screw having the same number of starts. In order to maintain the planetary rollers having starts within the nut during rotation, the ratio of the nut diameter to the roller diameter is made equal to the number of starts. High gear ratios (small lead) may be obtained only when utilizing a very fine thread design: i.e., a large number of threads per unit length which is impractical to produce due to the very tight tolerances. Furthermore, when utilizing a nut and screw shaft, the threads of which extend in the same helical direction, with planetary rollers having starts, a large helix angle mismatch of the shaft threads with the planetary rollers occurs which results in poor load carrying capability.

When utilizing a nut and screw shaft, the threads of which extend in the same direction with planetary rollers having no starts, it is mandatory that the rollers be recirculated; i.e., that the rollers be removed from engagement with the nut and screw shaft and be moved axially to return the planetary roller to a former position so that the roller will be retained between the nut and screw shaft during extended rotation times. This mode of operation causes radially asymmetrical static forces and radial and axial dynamic imbalances that prevent quick acceleration or deceleration and also prevents high speed rotation.

Accordingly it would be desirable to provide a roller screw drive which permits obtaining a high gear ratio (small lead) without the necessity of utilizing a fine thread design. Furthermore, it would be desirable to utilize a roller screw design which does not require extreme thread helix angle mismatch between the planetary rollers and the nut and screw. Also, it would be desirable to have a roller screw design that utilizes planetary rollers which does not require roller recirculation.

SUMMARY OF THE INVENTION

In accordance with this invention, a roller screw drive is provided which is capable of employing planetary rollers without the need for planetary roller recirculation means and which can employ planetary rollers with starts while achieving high gear ratios. In addition, the present invention provides a roller screw drive capable of fixed speed drive or variable speed drive. The roller screw drive of this invention includes a nut and screw having unequal starts. By the term "unequal starts" as used herein is meant (a) the helical threads on the nut and screw shaft extend in opposite directions, (b) the absolute number of starts on the nut and screw shaft are unequal or a combination of (a) and (b) as defined above. The thread on the planetary roller can be helical extending in either direction. The terms "helical" and "helical thread" as used herein are meant to mean a helix as well as to include the degenerate case where a helix becomes a circle and a helical thread with zero starts is a series of equidistant grooves perpendicular to the axis of symetry of the part. In addition, the "helical thread" can extend in a constant direction (smooth) or the direction along the thread can change (non-smooth) so long as the overall thread extends in a helical direction, e.g. see FIG. 3. The roller screw drive of this invention can be made so that the planetary rollers do not move axially relative to the nut to allow unlimited axial motion of the nut relative to the screw shaft. Alternatively, the planetary rollers can be allowed to move axially relative to the nut in combination with means for limiting the axial movement of the nut thereby to maintain the planetary rollers at least partially in place within the nut. The roller screw drive can be a fixed ratio drive or a variable ratio drive.

DESCRIPTION OF SPECIFIC EMBODIMENTS

Figure 1:
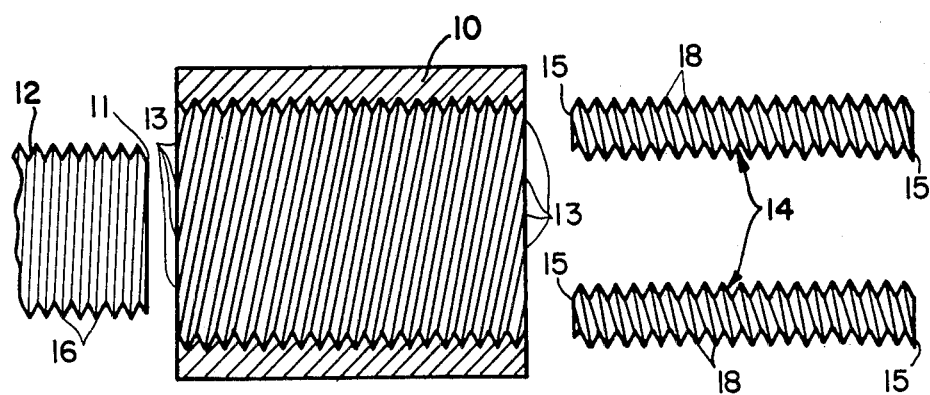
FIG. 1 is an exploded cross-sectional view of the apparatus of this invention.

In the present invention, an apparatus is provided for converting rotational motion to linear motion which comprises a shaft, a plurality of planetary rollers in contact with the screw shaft and a nut surrounding and in contact with the planetary rollers. The screw shaft and the nut each are provided with a helical thread which mate with the thread of the planetary rollers interposed between and in contact with the nut and the screw shaft. The helical threads can be continuous or non-continuous, smooth or non-smooth, so long as the threads on the shaft, nut and planetary rollers mesh during rotation and so long as the direction of the thread is generally helical. In the present invention, the signed number of starts on the screw shaft is different from the signed number of starts on the nut. In one embodiment of this invention wherein it is desired to prevent relative axial motion between the nut and the rollers, it is necessary that the helix angle of each roller be substantially the same, and that they be substantially the same as the helix angle of the nut. The helix angle is determined by the thread lead (axial distance along the shaft per revolution of the nut) and the pitch diameter (diameter of the thread where no skidding occurs between adjacent contact of rolling members). The numbers of threads per inch of the nut and the roller must be the same in order for them to mesh. The pitch diameter of the nut is a number times the pitch diameter of the roller and for no axial motion of the roller relative to the nut this number is an interger and comprises the number of starts (beginning of the helix) on the nut per start on the roller. Generally, this number is between 3 and about 500, preferably between 3 and about 20.

The screw shaft and roller both have external threads. Therefore, when using roller threads having helix angles equal to but of opposite sign to the helix angle of the screw shaft thread, there is no relative axial motion between the screw shaft and the rollers during rotation. Note when the screw shaft is provided with a helix angle which added to that of the rollers is non-zero, axial motion of the shaft relative to the rollers will occur when the nut is rotated. A very small helix angle sum will result in a very small axial motion per revolution of the nut while a large helix angle sum between the rollers and the screw shaft results in a large axial motion per revolution. The helix angle ($\alpha$) of the screw shaft pitch diameter ($D_{sp}$) in combination with the threads per inch (T) on the screw shaft determines the number of the starts ($S_s$) on the shaft in accordance with the formula:

$$S_s = T \text{ thread lead} = T\pi D_{sp} \tan \alpha$$

The number of starts is an integral number and if the pitch diameter is constrained, the helix angles available are discrete.

The planetary rollers must simultaneously mesh with both the screw shaft and the nut. When the signed number of starts of the shaft and nut are not equal, the radial projections of the threads of the shaft and the nut criss-cross each other. A roller with a single start thread has a high point of its thread 180° opposite a low point of its thread. Such a roller can only mesh simultaneously with the shaft and the nut when a shaft high point crosses a nut low point. There is only one such roller position per thread crossing. The maximum number of allowable roller positions is, therefore, the difference between the starts of the nut and the shaft. With the prior art degenerate case of equal number of starts, i.e., difference equals zero, either zero or an infinite number of roller positions is allowable depending on axial the position of the shaft relative to the nut. When it is desirable to have no axial motion of the roller with respect to the nut, the pitch diameter of the nut ($D_{np}$) must be an integral multiple (I) of the roller pitch diameter ($D_{rp}$) with the nut starts ($S_n$) being that integral multiple (I) times the number of roller starts ($S_r$) in accordance with the following mathematical relationships:

$$D_{np} = I \cdot D_{rp} \text{ and: } S_n = I \cdot S_r$$

When this criteria is met, the nominal shaft pitch diameter therefore has been specified as the nut pitch diameter minus two times the roller pitch diameter. Ratios slightly different from these discretely defined ratios can be obtained by making the actual pitch diameter different from its nominal value by slight skidding of the rollers. In effect, the pitch diameter of the roller in contact with the nut can be made different from the pitch diameter of the roller in contact with the shaft. This results in simultaneously having two different helix thread angles on the roller with the screw shaft meshing with one angle and the nut meshing with a different angle of the roller. Such small variations in the pitch diameter are achievable by changing the location of the no-skid point in the contact patch. This can be achieved by applying a force to the planetary rollers by any convenient means such as centrifugally, mechanically, magnetically, etc.

Providing means to continuously vary the instantaneous pitch diameter allows for a continuously variable ratio drive to be built, for example, by causing the rollers to run closer to or further from the screw shaft axis. One embodiment is achieved by utilizing a means such as a cone at each end of the rollers to force the rollers toward the shaft, and by using centrifugal (inertial) force or radially imbalanced resultant forces to move them away from the shaft. When a continuously variable ratio drive is based on nominally matching the helix angle of the screw shaft with that of the roller, it is bidirectional having both positive and negative ratios.

This roller drive concept is applicable to any linear motion producing system which is actuated by a rotary motion. Applications include any apparatus that utilized ball screws or roller screws. Fox example, automotive steering gears, large valves in the petrochemical industry, reciprocating pumps, numerical control equipment and aircraft control surfaces such as flaps. Other applications include those for which ball screws and roller screws are currently too expensive. Large volume applications include electric windows and electric seat adjustment of automobiles, jacks and floppy disk head drives.

Figure 2:
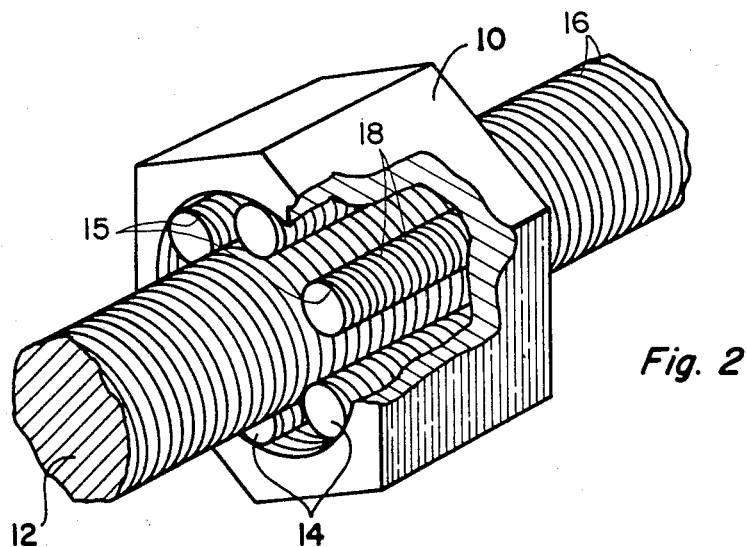
FIG. 2 is an isometric view of the apparatus of this invention.

Referring to FIGS. 1 and 2, the apparatus of this invention includes a nut 10 having starts 13, a screw shaft 12 having start 11 and a plurality of planetary rollers 14 having start 15 interposed between and in contact with the nut 10 and the screw shaft 12. The direction of the helical thread 16 of the screw shaft 12 is opposite to the direction of the helical thread 18 on the planetary rollers 14. In addition, the direction of the helical threads 18 on the planetary rollers is the same as the direction of the helical thread 20 on the nut 10. When the nut 10 is rotated, it does not move axially relative to the planetary rollers 14. However, both the nut 10 and planetary rollers 14 move axially as a single unit relative to the screw shaft 12. Furthermore, when the screw shaft 12 is rotated while the nut 10 is fixed, the screw shaft moves axially relative to the planetary rollers and the nut 10.

This invention can function with only one roller if external means are provided to keep the shaft and nut concentric, e.g. bearings. In order to provide balanced forces during rotation of the screw shaft 12 relative to the nut 10, at least two planetary rollers 14 are required. At least three planetary rollers are employed in order to obtain smooth stable rotation while supporting side loads without the necessity of external means of maintaining concentricity of shaft and nut. The optimum number is dependent upon the diameter of the nut and screw shaft and upon the size of the planetary roller used.

Figure 3:
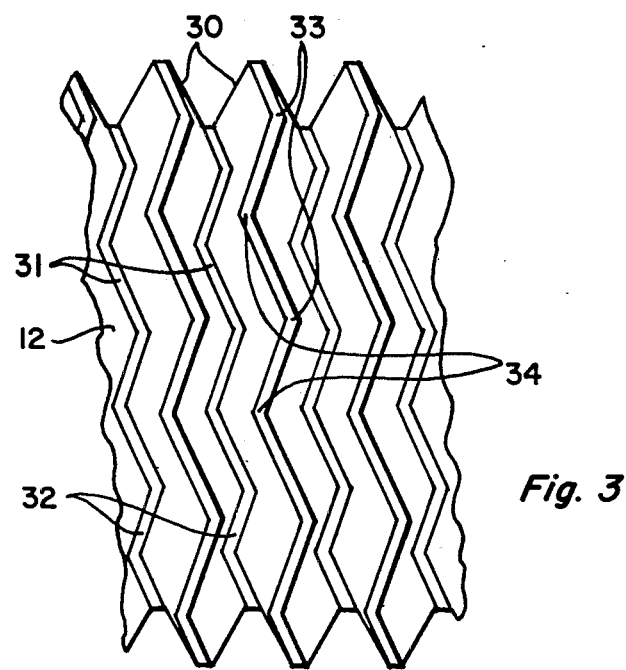
FIG. 3 shows an embodiment of this invention utilizing a non-smooth generally helical screw shaft thread also suitable for unlimited axial travel of the nut relative to the screw shaft.
Figure 7:
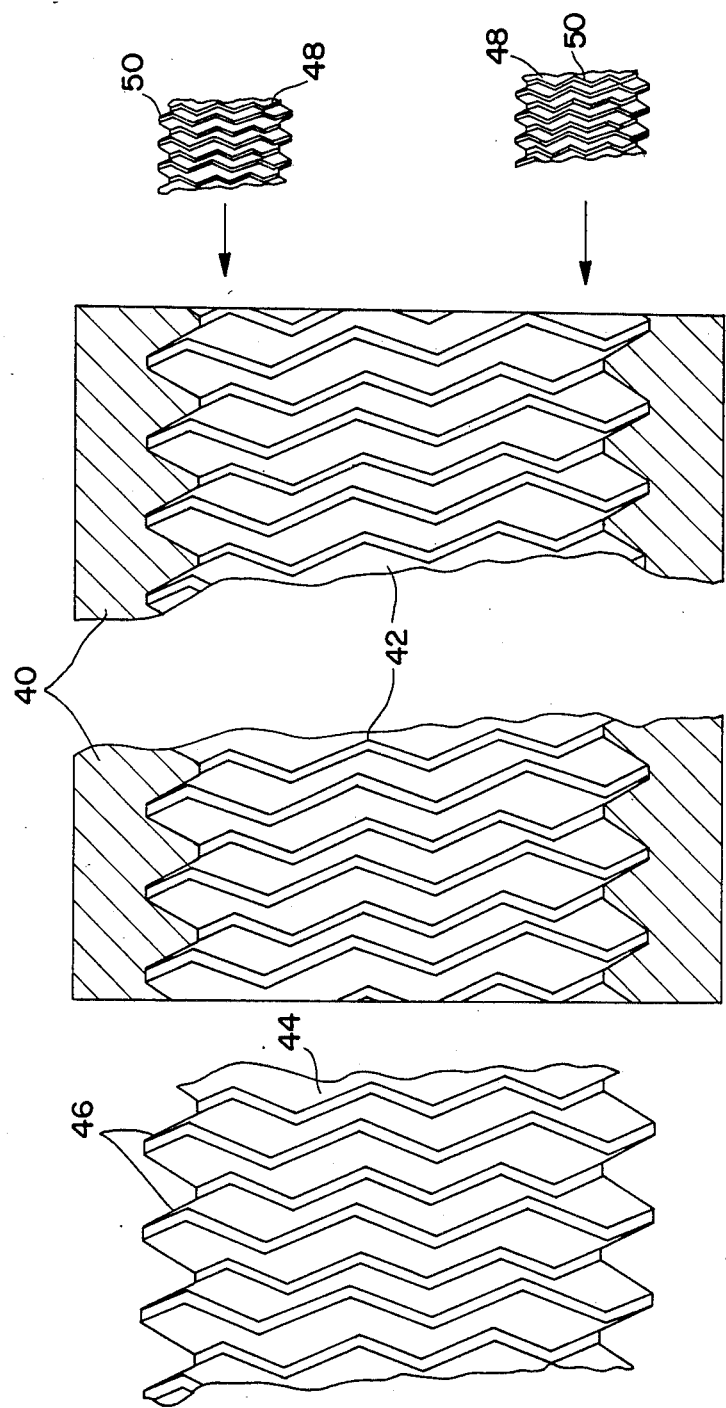
FIG. 7 shows an embodiment of this invention wherein a nut, screw shaft, and planetary rollers all have zigzag helical threads.

Referring to FIG. 3, the screw shaft 12 is provided with a zigzag generally helical thread 30 comprising helical path section 31, 32, 33 and 34 which mates with complementary zigzag helical threads on planetary rollers (not shown). The planetary roller threads, in turn, mate with a complementary zigzag thread on a nut (not shown). The planetary rollers and nut, when rotated, travel smoothly, rotationally and smoothly axially while the point of thread mesh zigzags axially during rotation. The net motion (axial and rotational) is as if the threads 30 were smooth helical. Because of the zigzag design, the pitch diameters are constrained from skidding. Referring to FIG. 7, the apparatus of the invention includes a nut 40 having zigzag helical threads 42 as well as a screw shaft 44 having zigzag helical threads 46 and a plurality of planetary rollers 48 having herein zigzag helical threads 50.

Figure 6:
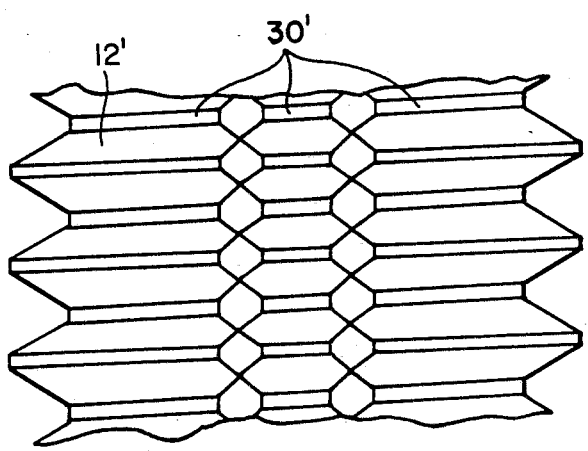
FIG. 6 shows an embodiment of this invention utilizing an interrupted thread design that prevents skidding during rotation.

Referring to FIG. 6, the screw shaft 12 is provided with an interrupted or discontinuous substantially helical thread 30' which mates with complementary interrupted threads on planetary rollers (not shown). The planetary rollers, in turn, mate with a complementary interrupted thread on a nut (not shown). The planetary rollers and nut, when rotated, travel smoothly, rotationally and smoothly axially while the point of thread mesh is interrupted axially during rotation. The net motion (axial and rotational) are as if the threads 30' were continuous helical. Because of the interrupted thread design, the pitch diameters are constrained from skidding.

Figure 4:
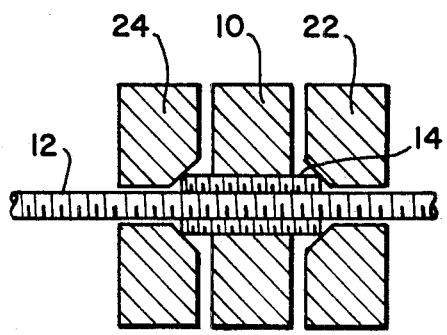
FIG. 4 shows a cross-section of a continuously variable bidirectional drive suitable for use in this invention.

Referring to FIG. 4, a continuous variable bidirectional drive apparatus is shown. The apparatus includes a nut 10, planetary rollers 14 and screw 12. The roller and shaft can freely roll (and skid) together with their actual instantaneous pitch diameters relative to each other unconstrained. Cones 22 and 24 are provided at opposite ends of the planetary roller 14 which can be utilized to move the planetary rollers 14 towards the shaft 12. This causes the actual pitch diameter of the shaft to change, and the roller pitch diameter in contact with the shaft to change. Alternatively, the cones can be removed from contact with the planetary rollers 14 so that their inertial (centrifugal) force moves them away from contact with the screw 12. The apparatus shown in FIG. 4 will result in a variable gear ratio varying between positive and negative values when the helix angle of the rollers is the same at some point within its range of motion as the helix angle of the nut and negative the nominal helix angle of the shaft. For example, this is accomplished in FIG. 4 by making the nut four starts right handed thread, the rollers one start of right handed thread and the shaft two starts of left handed threads.

Figure 5:
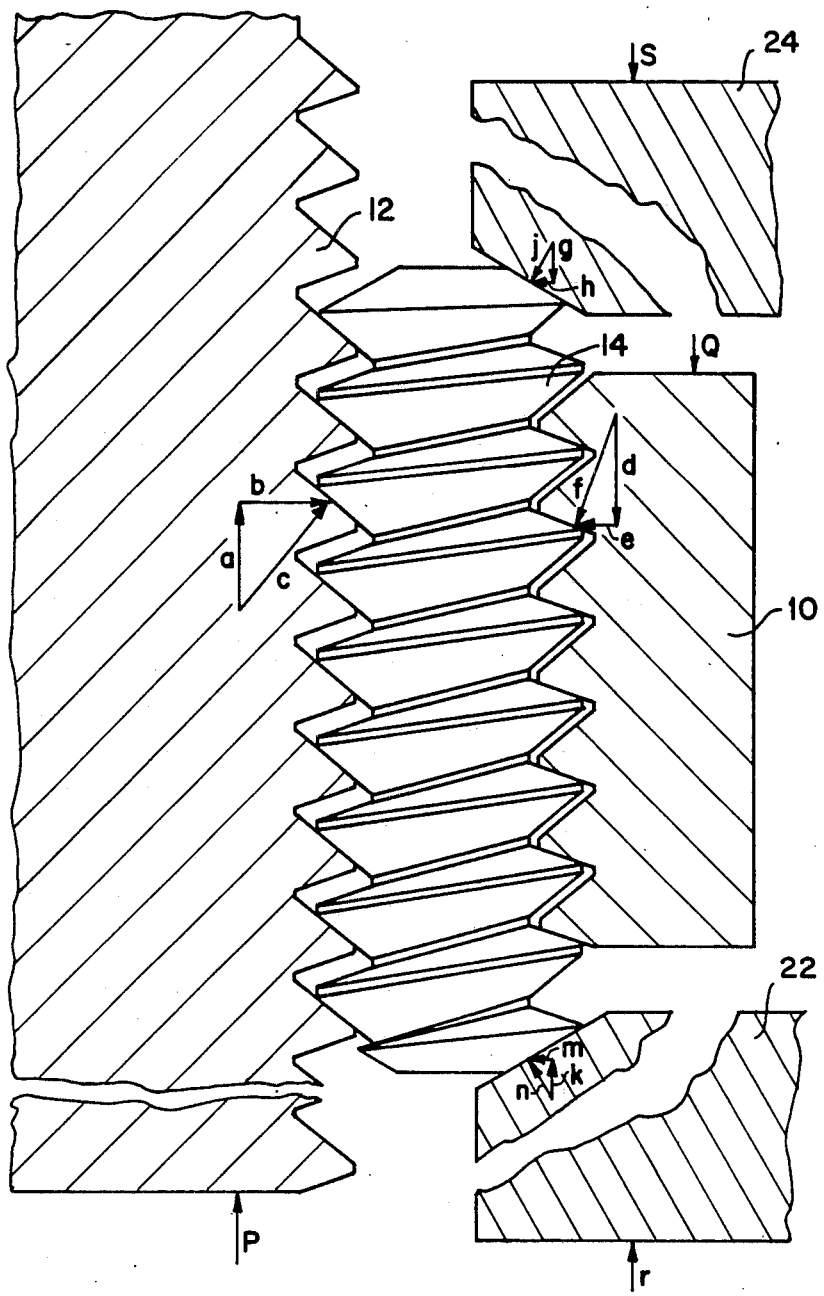
FIG. 5 is a cross-sectional view of one version of the apparatus of FIG. 4 showing the forces that exist among the different components.

FIG. 5 shows an example of using resultant forces to separate the roller 14 from the shaft 12 and cause it to follow the cones 22 and 24 when the cones are separated. This design is suitable for bidirectional motion but only unidirectional force. The thread shown in FIG. 5 is not symmetrical. When the linear drive delivers a force, p, from the shaft to the load, which is carried through the rollers 14 to the nut 10 and balanced by force Q, there are side forces developed against the roller 14. Assuming, for the moment, frictionless surfaces to simplify this explanation, the force p is transferred to the roller 14 as force a, but since the force must be normal to the thread surface, it is the vector force c which is made up of the axial component a and the radial component b. This same force must be transferred from the roller 14 to the nut 10, and the magnitude of force d must, therefore, be equal to the magnitude of force a. Force d is derived from the normal force f, which has also a radial component e, which is significantly smaller than the radial component of the shaft force which is labeled b. Therefore, there is a net force on the roller 14 away from the shaft 12 which is balanced by the cone forces j and k. The cones 22 and 24 are merely a control force where s is equal to r, and the sole function of the cones 22 and 24 is to move the roller 14 toward the shaft 12 or allow it to move away from the shaft 12. These are just two examples of many ways in which the rollers 14 can be moved toward or away from the shaft 12 while still allowing their freedom of rotation.

This embodiment of the continuously variable ratio drive has a nominal zero shaft motion per nut rotation. Therefore, varying the ratio about this point results in a bidirectional drive. This is very useful in applications involving a one direction relatively constant speed motor, such as an induction motor where a bidirectional control of axial motion is needed. Other applications might require a variable speed about a given ratio and would not necessarily be bidirectional. This is achieved by selecting the correct number of starts and diameters in the same manner as described earlier.

This continuously variable speed drive can result in very sizable acceleration rates since all the moving elements (rollers and nut plus primary drive means such as motor) all run at approximately the same speed and kinetic energy storage nearly independent of the instantaneous gear ratio. The nut and motor speed are truly independent of the instantaneous ratio.

I claim:

1. Apparatus for converting rotational motion to linear motion which comprises a screw shaft having a screw shaft thread with at least one start, a nut surrounding said screw shaft, said nut having an inner surface and a nut thread having at least one start on said inner surface, said nut thread having a different number or direction of starts than the starts of the thread on said screw shaft and at least one threaded planetary roller interposed between and meshing with said nut thread and said screw shaft thread whereby concentricity between said screw shaft and said nut is maintained, and wherein said threads follow a generally helical path but change direction along said generally helical path.

2. The apparatus of claim 1 which includes at least two planetary rollers.

3. The apparatus of claim 1 which includes at least three planetary rollers.

4. Apparatus of claim 1 wherein a helix angle of each planetary roller is substantially equal to a helix angle of the screw shaft.

5. Apparatus of claim 1 wherein a helix angle of each planetary roller is substantially equal to the helix angle of the nut.

* * * * *